(12) United States Patent
Tiryaki et al.

(10) Patent No.: US 11,401,022 B2
(45) Date of Patent: Aug. 2, 2022

(54) FLOOR SYSTEM FOR A VEHICLE

(71) Applicant: Airbus Operations GmbH, Hamburg (DE)

(72) Inventors: Memis Tiryaki, Hamburg (DE); Sven Werner, Hamburg (DE); Torsten Noebel, Hamburg (DE); Andre Zybala, Hamburg (DE); Wolfgang Eilken, Hamburg (DE)

(73) Assignee: Airbus Operations GmbH

( * ) Notice: Subject to any disclaimer, the term of this patent is extended or adjusted under 35 U.S.C. 154(b) by 246 days.

(21) Appl. No.: 16/571,398

(22) Filed: Sep. 16, 2019

(65) Prior Publication Data
US 2020/0086967 A1 Mar. 19, 2020

(30) Foreign Application Priority Data
Sep. 18, 2018 (DE) ...................... 10 2018 122 813.9

(51) Int. Cl.
*B64C 1/18* (2006.01)
*B64C 1/20* (2006.01)
*B64C 1/00* (2006.01)

(52) U.S. Cl.
CPC .................. *B64C 1/18* (2013.01); *B64C 1/20* (2013.01); *B64C 2001/0072* (2013.01); *B64C 2001/0081* (2013.01)

(58) Field of Classification Search
CPC ..... B64C 1/18; B64C 1/20; B64C 2001/0072; B64C 2001/0081; H02G 3/0487; H02G 3/383; H02G 3/38; B62D 25/20
See application file for complete search history.

(56) References Cited

U.S. PATENT DOCUMENTS

| 7,938,362 B2* | 5/2011 | Kismarton ................ B64C 1/18 244/117 R |
| 8,366,042 B2* | 2/2013 | Haselmeier ............... B64C 1/18 244/119 |
| 9,394,691 B2* | 7/2016 | Haselmeier ........ B64D 11/0015 |
| 9,623,914 B2 | 4/2017 | Grosse-Plankermann et al. |
| 9,896,843 B2* | 2/2018 | Peng ..................... E04F 15/185 |
| 2006/0051557 A1 | 3/2006 | Doskocz |
| 2007/0084966 A1 | 4/2007 | Haynes et al. |

(Continued)

FOREIGN PATENT DOCUMENTS

| DE | 10 2008 060 550 B3 | 6/2010 |
| DE | 10 2011 111 864 A1 | 2/2013 |

(Continued)

OTHER PUBLICATIONS

Search Report for Application No. GB1912917.0, dated Jan. 16, 2020, pp. 1-2.

(Continued)

*Primary Examiner* — Benjamin P Lee
(74) *Attorney, Agent, or Firm* — Lerner, David, Littenberg, Krumholz & Mentlik, LLP

(57) ABSTRACT

A floor system for creating a floor in an interior of a vehicle has base part and a floor panel. The base part having a trough-shaped depression and the floor panel are attached to a floor support structure and together provide a customary installation height and also cavities for accommodating installation objects.

15 Claims, 3 Drawing Sheets

(56) References Cited

U.S. PATENT DOCUMENTS

| | | | |
|---|---|---|---|
| 2008/0210820 A1* | 9/2008 | Kismarton | B64F 5/10 244/120 |
| 2010/0213314 A1* | 8/2010 | Haselmeier | B64C 1/18 244/119 |
| 2013/0340364 A1* | 12/2013 | Haselmeier | H02G 3/383 52/220.2 |
| 2015/0061380 A1* | 3/2015 | Schomacker | B63B 17/00 307/9.1 |
| 2017/0158334 A1 | 6/2017 | Wolgast | |

FOREIGN PATENT DOCUMENTS

| | | | | |
|---|---|---|---|---|
| DE | 102016122993 A1 | | 5/2018 | |
| GB | 719751 A | | 12/1954 | |
| GB | 2382872 A | * | 6/2003 | B64C 1/18 |
| JP | 2000135988 A | | 5/2000 | |
| WO | 2019154921 A1 | | 8/2019 | |
| WO | WO-2019218193 A1 | * | 11/2019 | H02G 3/38 |

OTHER PUBLICATIONS

Preliminary Search Report for Application No. FR1910178, dated Jan. 27, 2021, 1 page (categorizing the cited references).

* cited by examiner

FLOOR SYSTEM FOR A VEHICLE

FIELD OF THE INVENTION

The invention relates to a floor system for a vehicle and also to a vehicle which has at least one floor system of this kind.

BACKGROUND OF THE INVENTION

Vehicles for transporting passengers or freight usually have an interior which is enclosed by a vehicle structure and is fitted with a floor, at least in sections. A particular floor design may emerge, depending on the design of the vehicle. In the case of passenger or cargo aircraft, for example, it is known in the art for sandwich panels to be used on floor supports. The sandwich panels frequently have a honeycomb core in order to minimize weight, said honeycomb core being surrounded by top layers of a fibre-reinforced plastic. In order to attach sandwich panels of this kind to a vehicle structure, special inserts are required which are to be integrated in said sandwich panels during their production of the same. The inserts may be connected to the floor supports by screw fastenings.

If a defect should arise in a sandwich panel of this kind, it may be necessary to replace said panel. Due to the complex provision of in some cases individual inserts and the cost-intensive nature of the material, this can be expected to generate not insignificant costs which are increased still further by the greater assembly expenditure.

BRIEF SUMMARY OF THE INVENTION

Consequently, a problem addressed by the aspects of the invention is that of proposing an alternative floor structure in which both the production costs and the repair costs can be reduced.

A floor system for a vehicle is proposed. The floor system has a base part for laying on a floor support structure of the vehicle and a floor panel which can be laid on the base part. The base part has at least two peripheral surfaces and a trough-shaped depression arranged therebetween for receiving cables, wherein the base part has at least one stiffening member arranged in the depression, which stiffening member extends over the entire height of the depression. The floor panel and the at least one stiffening member have first and second connection members arranged in a complementary manner to one another, which are designed for the detachable, form-fitting connection of the floor panel and the at least one stiffening member. At least one first connection member is arranged on the at least one stiffening member and at least one second connection member is arranged on an underside of the floor panel. The floor panel is configured to correspond to the base part, so that it can be placed on the peripheral surfaces and the at least one stiffening member of the base part, and the at least one second connection member forms a connection with the at least one first connection member.

The floor system according to an embodiment of the invention is consequently made up of two main components which can be connected to one another in a form-fitting manner at least via the connection members, so that a floor can be produced. The peripheral surfaces of the base part mean that an installation height required for the floor structure can be achieved by floor panels which are substantially thinner compared with the prior art. However, these are mounted on more support points than is possible with thicker floor panels in customary structures, without the floor support structure being changed to achieve this. The functions and advantages of these components are described in greater detail below.

In the installed state, the base part forms a lower component of a floor and can be connected to the floor support structure. It may be made of a material that does not correspond to the material which is used to produce customary sandwich panels. It is conceivable for the base part to have an elongate shape overall. The base part could then extend roughly parallel to a main extension direction of the interior of the vehicle concerned.

In order to receive the floor, the interior may have an arrangement of floor supports which could be arranged parallel and/or transverse to the main extension direction of the interior and form the floor support structure. At least floor supports which run parallel to the longitudinal axis of the aircraft are known in aircraft interiors. The spacing of the floor supports relative to one another produces a maximum width of the depression in a cross section of the base part. The base part must therefore be of such dimensions that it is adapted to the installation space available. This results in the depression of a base part being located between adjacent floor supports.

The base part should be suitable for being fixedly connected to the primary structure of the vehicle, in order to provide a permanent and robust base for the floor. It is conceivable for the base part to have bearing surfaces on sides facing away from the peripheral surfaces which are of a suitable size for laying on the floor support structure. Screwing means can be used to fasten the base part, said screwing means being screwed into the floor support structure. These means could also extend through the floor panel located on the base part, in order to fasten the base part and the floor panel.

The depression in a base part forms a kind of trough which is used for receiving installation objects. The combination of the base part and floor panel thereby forms a housing with one or multiple embedded cavities through which the installation objects can extend. These could contain electrical cables and electrical components, in particular. Apart from power supply cables, data lines are also conceivable, with which entertainment devices installed in a cabin can be supplied with content. Coils for inductive data or electrical power transmission could also be accommodated therein.

The at least one stiffening member is used to create a sufficiently robust base for placing floor panels on top which have a relatively small thickness. This is preferably arranged in the depression in such a manner that a symmetrical force transmission between the floor panel and the base part is achieved. If there is only one single stiffening member in the depression, this could be arranged in the middle.

The number and distribution of the stiffening members may be made dependent on the anticipated surface load of the corresponding floor portion. If, for example, the depression is provided with a comparatively small width or if it is located in a rarely frequented region of a cabin or in a largely unladen portion of a hold, a single stiffening member could be sufficient to achieve a desired supporting function for the floor panel. However, if the depression extends over a comparatively large width or if the floor affects a portion with a greater load, multiple stiffening components could also be distributed in the depression.

A stiffening member preferably has a continuous, straight supporting edge or supporting surface on which the floor panel can rest. The stiffening member may be produced integrally with the base part or inserted subsequently.

The floor panels which can be laid on the base part may be configured as traditional floor panels, but with substantially thinner dimensions. For example, a floor panel of the floor system according to the invention may have a thickness of 10 mm or less. The basic structure could, however, contain a core with a low density, for example a honeycomb core or a foam core, and top layers covering this. By adding a floor panel to the base part in order to create a floor, it is conceivable for the peripheral surfaces to be configured in such a manner that floor panels are predominantly of the same design and may always exhibit the same inserts on the peripheral sides to create a sufficiently pressure-resistant receiving means for a screw fitting. Particularly in vehicles with a cross section that tapers in sections and a non-constant width of the interior, modified base parts could be used in sections, which base parts can close transitional regions that are too small to receive a floor panel of the same size as in the neighbouring regions. Modified base parts of this kind could be partially thicker and provided with a depression for receiving a floor panel.

In summary, the floor system according to an embodiment of the invention is capable of using more cost-effective and easily exchangeable floor panels which can withstand the envisaged loads. Furthermore, the floor system offers a simple possible means for holding cables and other installation objects and at the same time protecting them from external influences.

In a particularly preferred embodiment, the first and second connection members are designed to produce a snap-on connection. This makes the assembly of a floor panel easier, since a floor panel can be clicked onto the appropriate stiffening members for prefixing through simple orientation and pressing. A more elaborate fastening to the stiffening members to bring about a sufficient supporting function on the part of said stiffening members is not required.

The connection members preferably each extend along a straight section on the at least one stiffening member or floor panel. By avoiding a more complex geometry, the correct attachment and orientation of the second connection member to the floor panel can take place very easily.

The connection members preferably each extend along at least 90% of an available length of the at least one stiffening member or the floor panel. The orientation of the floor panel and the stiffening member relative to one another during assembly can thereby be improved. Following assembly, locally occurring shear or thrust loading of the floor panel, in particular, can also be compensated to a greater degree.

One of the first and second connection members could exhibit a first profile cross section and the other of the first and second connection members could exhibit a second profile cross section, wherein the first profile cross section exhibits a bulge, wherein the second profile cross section exhibits an indentation and wherein the first profile cross section and the second profile cross section are designed so that the bulge snaps into the indentation by applying pressure. The embodiment of the connection members is therefore mechanically very simple and yet allows a secure connection. The bulge could be configured with a piping-like form. The indentation is shaped to match the bulge and can preferably be reached through a slot. The second profile cross section in this case should be configured in such a manner that by pressing the first profile cross section the slot is widened, so that the first profile cross section goes into the indentation and the slot then springs back again into a stress-relieved position. In order to fulfil this function, the size of the slot and the shape thereof is dependent on, among other things, the choice of material. In turn, the slot should exhibit a rounded profile, in order to avoid damage during assembly.

The bulge is preferably based on an arcuate form or a drop shape. This means that the portion of the profile cross section forming the bulge is circular or drop-shaped in sections. The locking or snapping of the bulge into the depression is supported, since the expansion and springing-back of the slot leading to the indentation can take place smoothly.

It is advantageous for the second connection members to be adhered to the underside of the floor panel. In this way, second connection members can be produced separately from floor panels, so that these can then be cut to size and attached. In this way, the first assembly can also be performed very easily and cost-effectively.

In a preferred embodiment, at least one of the connection members is made of a metallic material. This could relate to the second connection member, for example, which is arranged on the floor panel. However, if the base part is made of a metallic material, the first connection member could also be realized integrally with the relevant stiffening component and, consequently, made of a metallic material. Aluminum, in particular, could be chosen as a suitable material, since it has a low density and high strength, depending on the alloy used. When selecting, however, care should be taken to ensure that the connection member with the indentation, in particular, is also sufficiently flexible to allow latching or snapping in, if this is desired.

The base part may preferably be made of a fibre-reinforced plastic material. This comprises a matrix material in which reinforcing fibres are embedded. These may be realized in the form or glass or carbon fibres. The orientation of the fibres may be multi-directional and load-appropriate, so that the base part has sufficient strength to carry and support a floor panel. The matrix material may be a thermosetting material or a thermoplastic. In the latter case, polyamide, PEKK, PEEK or PPS could be used. One advantage of using a thermoplastic would be the possibility of producing the base part by extrusion.

As is common in the prior art, the floor panel could be made of a sandwich material with a honeycomb core and top layers covering the honeycomb core. The top layers in this case are preferably arranged parallel to one another and the honeycomb core then has a uniform thickness, in particular. The top layers, in particular, are preferably arranged parallel to one another and the honeycomb core exhibits, in particular, a uniform thickness. In order to achieve a high load-bearing capacity, the top layers may, in particular, be made of a carbon fibre-reinforced plastic. The honeycomb core could be based on a flat, multiple-folded aramid or polyaramid fabric which is phenol resin-impregnated and hardened. A comparatively thin honeycomb core with a thickness of under 10 mm may be chosen due to the additional supporting function of the at least one stiffening member.

Due to the small thickness required and the support by the at least one stiffening member, a floor panel could be made of a different material, however, which has a layered structure or a monolithic design. A foam-based core, for example, which is of substantially simpler design compared with the honeycomb core would be conceivable, said core being surrounded by top layers. It would also be conceivable for multiple layers of a fibre-reinforced plastic to be exclusively used.

The second connection member may be integrated into a top layer of the floor panel. This may involve the joint hardening of one or multiple layers of a fibre-reinforced plastic, if the second connection member is made from such a material. When producing one of the top layers concerned, a second connection member, for example, in the shape of a preform made of an impregnated and partially or pre-hardened material could be applied to the top layer, in order to achieve complete hardening. On the other hand, when producing a top layer, a second connection member could also be used which is made of a different material and integrated into a layer structure of a top layer, after which the composite made up of the layer structure and the second connection member is left to harden.

The invention further relates to an aircraft comprising an interior with a floor support structure and a floor arranged thereupon which is produced using a floor system according to the preceding description.

The interior in this case may be a cabin or cargo hold.

BRIEF DESCRIPTION OF THE DRAWINGS

Further features, advantages and possible applications of the present invention emerge from the following description of the exemplary embodiments and the figures. In this case, all the features described and/or graphically represented create the subject matter of the invention individually and in any combination, even independently of their composition in the individual claims or the appendances thereof. Furthermore, identical reference numbers stand for the same or similar objects in the figures.

DETAILED DESCRIPTION

Figure 1:
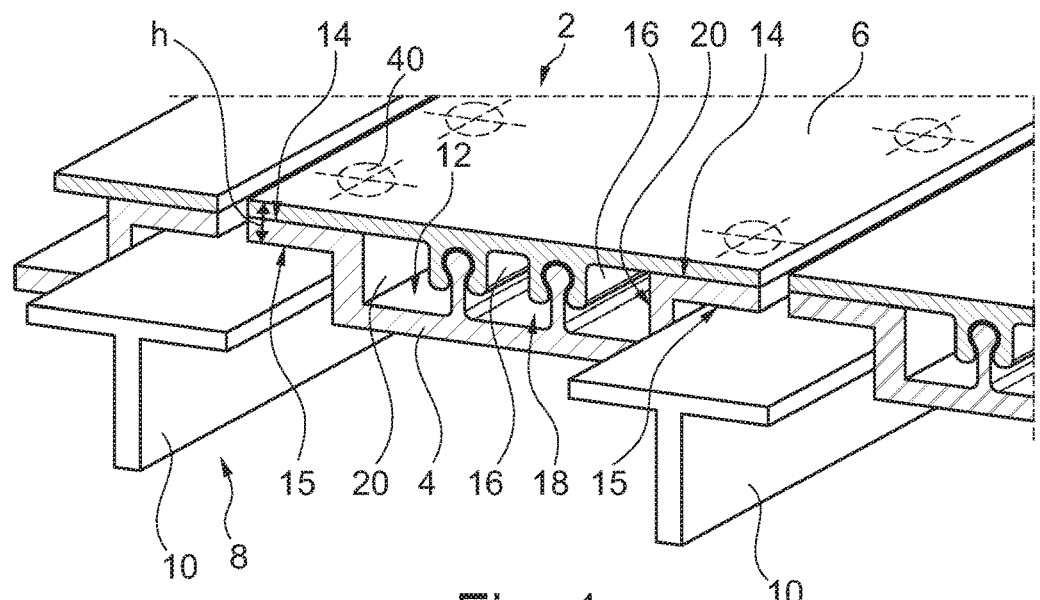
FIG. 1 shows a schematic, three-dimensional view of a floor produced by the floor system according to an embodiment of the invention.

FIG. 1 shows a partial detail of a floor 2 arranged in a vehicle, which floor is created using a floor system comprising base parts 4 and floor panels 6. The floor is provided to be attached to a floor support structure 8 which contains floor supports 10. These are connected to a primary structure of the vehicle which, for simplicity's sake, is not shown here. The indicated profile is chosen at random and does not limit the subject matter of the invention.

The base part 4 is, for example, an elongate component extending between two floor supports 10 running parallel to one another. It has a trough-shaped depression 12 which has a width that corresponds by way of example and preferably to a space between the two floor supports 10. Peripheral surfaces 14 are provided on both sides which receive the floor panel. On an opposite side of the peripheral surfaces 14, bearing surfaces 15 are provided which can be placed on the floor supports 10. The combination of both bearing surfaces 15 and the depression 12 orients the base part 4.

By way of example, two stiffening components 16 are located inside the depression 12 and are oriented perpendicularly to a base surface 18 of the depression 12. The base surface 18 is, moreover, configured by way of example parallel to a floor plane to be produced. However, this is not strictly necessary, but is provided for integration of the stiffening components 16. Between side surfaces 20 which extend from the bearing surfaces 14 to the base surface 18 and the stiffening members 16, a total of three chambers or channels are formed which are suitable for the ducting of cables or other installation objects.

The base part 4 provides a given material thickness between the peripheral surfaces 14 and the bearing surfaces 15 which, when combined with the relevant floor panel 6, defines an installation height h. This installation height h may correspond to the thickness of a customary floor panel which, in the case of traditional floors, would otherwise be laid on a floor support 10. Through the embodiment according to the invention, however, a substantially smaller thickness is required for the floor panel 6. This reduces costs, particularly when replacing a faulty floor panel 6, and may at the same time offer an additional function on account of the trough-shaped depression 12. A thinner floor panel 6 is adequately supported by the additional stiffening members 16, thereby preventing any damage to them.

The base part 4 may be made of a fibre-reinforced plastic material. The entire base part 4 could be produced by extrusion using a thermoplastic as the plastic matrix. The base part 4 is particularly realized in one piece and without joints.

Figure 2:
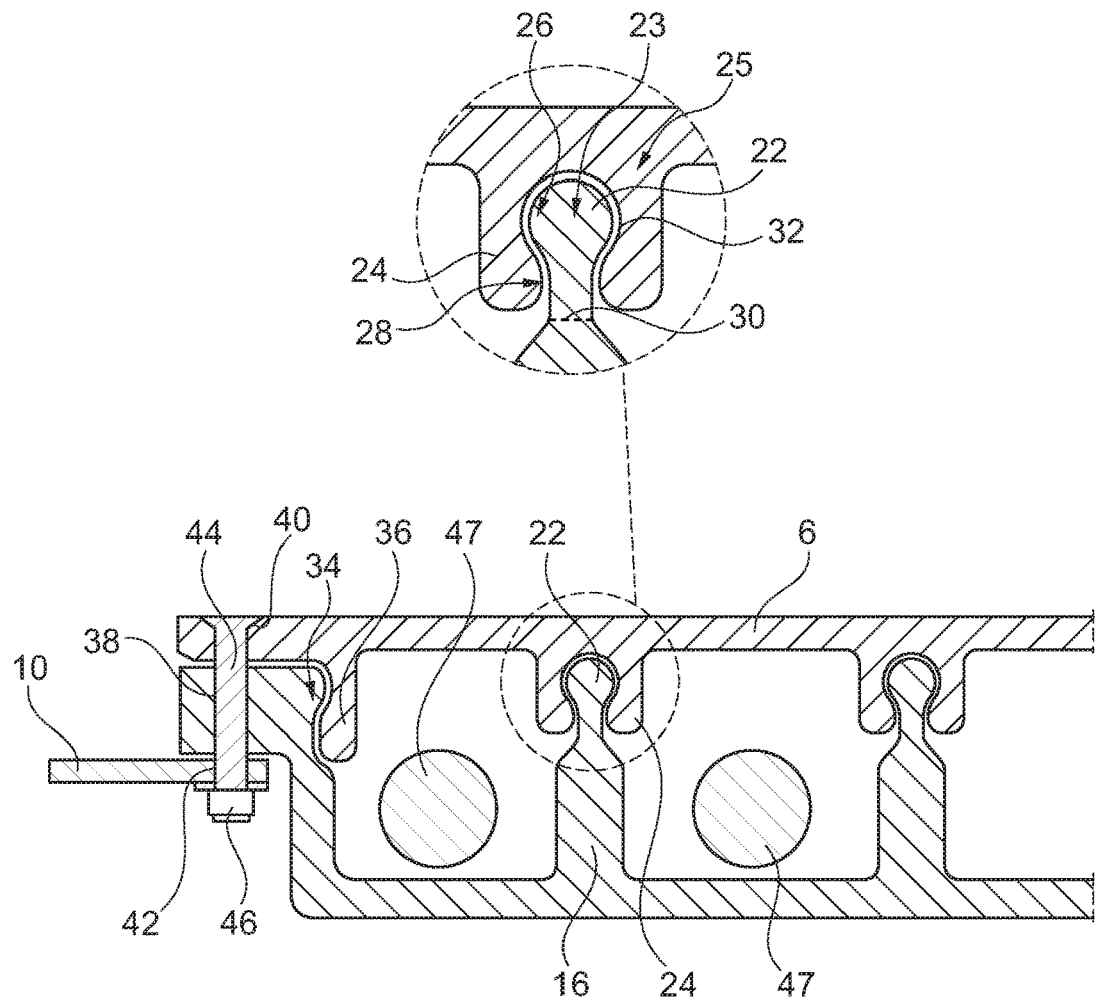
FIG. 2 shows a sectional depiction of the floor of FIG. 1.

As indicated in FIG. 1 and depicted in greater detail in FIG. 2, a connection between the floor panel 6 and the base part 4 in the region of the stiffening members 16 is moreover expedient. For this purpose, the stiffening members 16 have a first connection member 22 and the floor panel 6 has second connection members 24. The first connection members 22 and the second connection members 24 are designed to be complementary to one another and configured in such a manner that they create a form-fitting connection. In the example shown, both connection members 22 and 24 are designed to form a latching or snap-in connection.

The first connection members 22 are, by way of example, designed with a drop-shaped first profile cross section 23, so that a bulge 26 and a constriction 28 result. The second connection member 24 is, moreover, configured in such a manner that there is a slot 30 through which the bulge 26 has to be pushed, in order to reach an indentation 32. The constriction 28 of the first connection member 22 then lies level with the slot 30 and the bulge 26 lies in the indentation 32. In order for the first connection member 22 to be pressed into the second connection member 24, the second connection member 24 has to widen slightly in the region of the slot 30. A certain degree of material elasticity is required for this.

Self-evidently, the arrangement of the first connection member 22 and the second connection member 24 could also be provided in the reverse order. A stiffening member 16 could therefore be provided with an indentation 32, while the bulge 26 would be arranged on the floor panel 6.

By way of example, the floor panel 6 and the second connection member 24 have a one-piece configuration. The one-piece configuration could, for example, relate to the fact that the second connection member 24 is likewise produced by a layered structure, such as a top layer of the floor panel 6. The top layer or the entire floor panel 6 could then be hardened along with the second connection member 24 arranged thereon.

It may be advisable for additional third connection members 34 and fourth connection members 36 to be provided which are used in laterally external regions of the depression 12. The third connection members 34 may exhibit an indentation in the side surfaces 40, for example. Fourth connection members 36 which represent a drop-shaped indentation are designed to correspond thereto. The floor panel 6 may therefore be laid on the base part 4 from above, in order to connect the first connection members and the second connection members 22 and 24 to one another after a compressive force has been exerted and, at the same time, the third connection members and the fourth connection members 34 and 36 on the periphery.

Traditional fastening methods can be used to fasten these components to the floor supports 10. For example, the base part 4 has through-holes 38 in the peripheral areas 14 and bearing areas 15 which are aligned with holes 40 in the floor panel 6 and also with through-holes 42 in the floor support 10. A bolt 44 may be inserted through the three holes 38, 40 and 42 aligned with one another and then secured using a nut 46. The through-holes 40 may be lowered to receive a countersunk screw, i.e. have a conical, flared region.

With a layered structure of the floor panel 6 without a core layer, this variant may be sufficient for fastening. It is conceivable when using a core with a cavity in a region enclosing the through-holes 40 to arrange an insert which prevents damage to the core. It is self-evident that multiple arrangements of this kind are arranged in a given pattern along the floor support 10.

The cavities formed in the depression 12 are fitted with cables 47, for example, as installation objects. If the floor supports 10, and therefore the base part 4 and the floor panel 6, run parallel to a longitudinal axis of the vehicle, the cables 47 may be laid along the longitudinal axis. In this way, facilities in the cabin or cargo hold can be supplied with electrical power and/or data.

Figure 3:
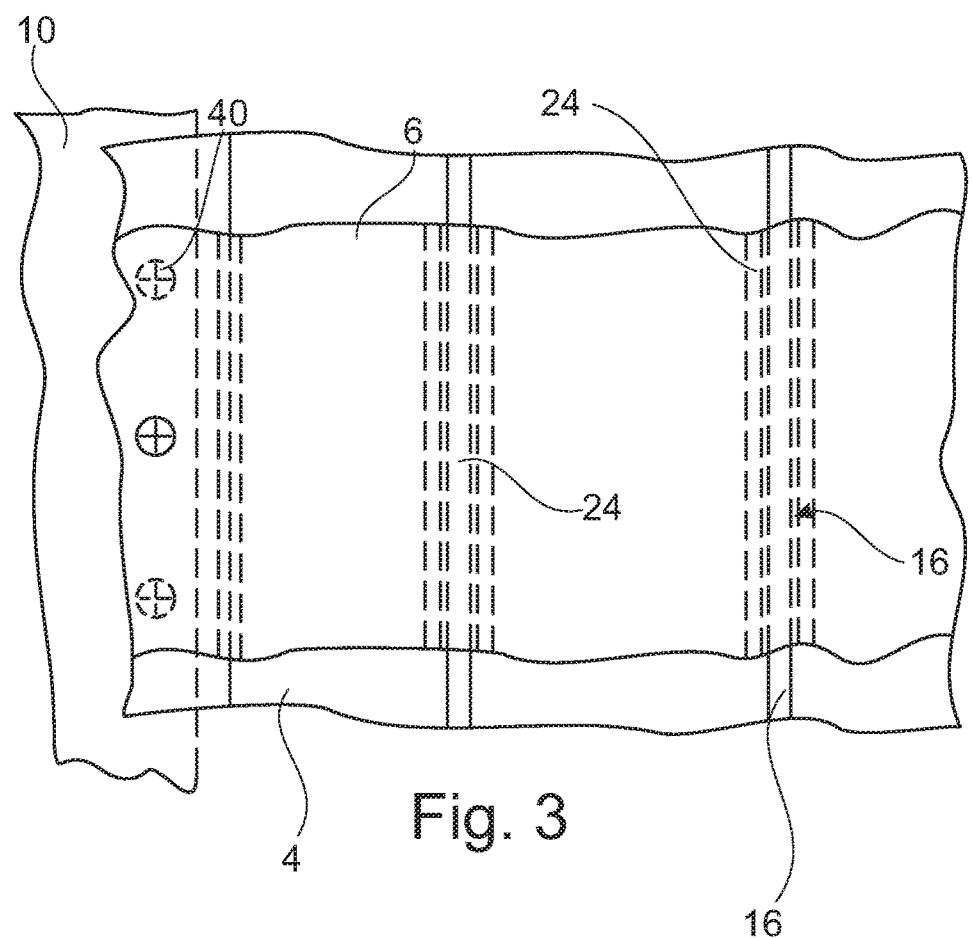
FIG. 3 shows a plan view of the floor of FIG. 1.

FIG. 3 shows a plan view of the floor 2 and a floor support 10 which is connected by multiple bolts 44 to the base part 4 and the floor panel 6. The stiffening members 16 run parallel to one another and at uniform intervals, for example. The intervals and the number of stiffening members 16 may be selected depending on the material used for the floor panel 6 and also the loads that are to be expected. Regions may exist which are provided with only one stiffening element 16, while in other regions there may also be more stiffening elements 16 present.

Figure 4:
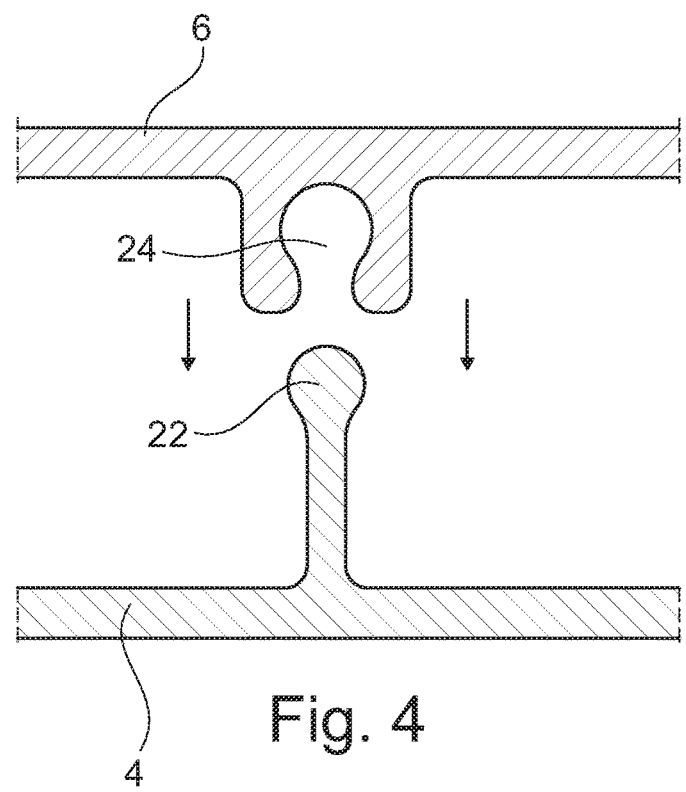
FIG. 4 shows a detail representation of a first and a second connection member, according to an embodiment of the invention.

FIG. 4 shows by way of example a small detail from the floor panel 6 and the base part 4, in order to demonstrate the composition of a first connection member 22 and a second connection member 24.

Figure 5:
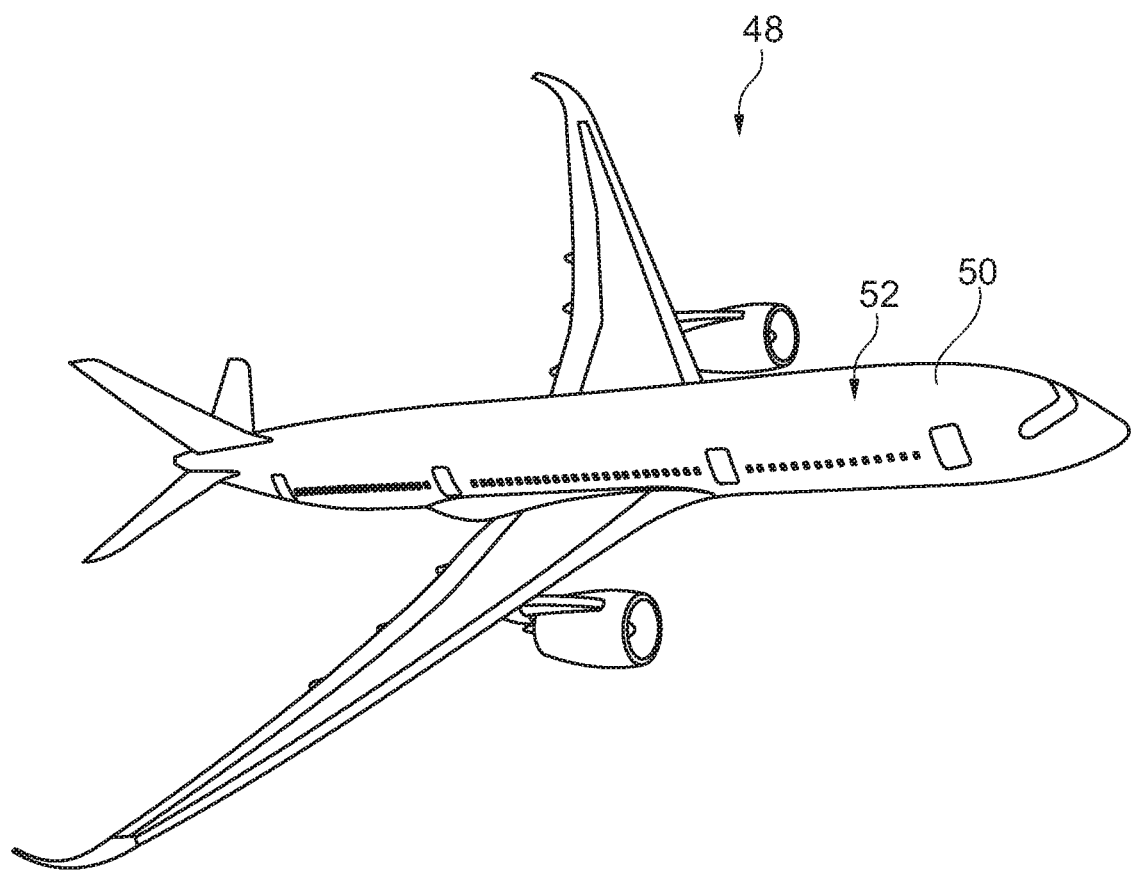
FIG. 5 shows an aircraft which has a floor created using the floor system according to an embodiment of the invention.

Finally, FIG. 5 shows an aircraft 48 with a fuselage 50 which may have an interior 52 with a primary structure. A floor support structure 8 with multiple floor supports 10 which support at least one floor 2 according to the invention is arranged thereon.

In addition, it should be pointed out that "comprising" does not preclude other members or steps and "a" or "an" does not preclude a plurality. It should further be pointed out that features which have been described with reference to one of the above exemplary embodiments can also be used in combination with other features of other exemplary embodiments described above. Reference numbers in the claims should not be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor system for creating a floor in an interior of a vehicle, comprising:
   a base part for laying on a floor support structure of the vehicle, the floor support structure comprising at least a first floor support with a first lateral surface and a second floor support with a second lateral surface; and
   a floor panel configured to be laid on the base part,
     wherein the base part has at least two peripheral surfaces and apposed bearing surfaces and a trough-shaped depression arranged therebetween for receiving installation objects, the bearing surfaces for laying on the lateral surfaces of the first and second supports,
     wherein the base part has at least one stiffening member arranged in the depression, the stiffening member extending over the entire height of the depression, wherein the floor panel and the at least one stiffening member have first connection members and second connection members arranged in a complementary manner to one another, which are configured for detachable, form-fitting connection of the floor panel and the at least one stiffening member,
     wherein at least one first connection member is arranged on the at least one stiffening member and at least one second connection member is arranged on an underside of the floor panel, and
     wherein the floor panel is configured to correspond to the base part, so that the floor panel is placed on the peripheral surfaces and the at least one reinforcing component and the at least one second connection member forms a connection with the at least one first connection member.

2. The floor system according to claim 1, wherein the first connection members and the second connection members are configured to produce a snap-on connection.

3. The floor system according to claim 1, wherein each of the connection members extends along a straight section on the at least one stiffening member and the floor panel.

4. The floor system according to claim 1, wherein each of the connection members extends along at least 90% of an available length of the at least one stiffening member or the floor panel.

5. The floor system according to claim 1, wherein one of the first connection members and the second connection members has a first profile cross section and the other of the first connection members and the second connection members has a second profile cross section,
   wherein the first profile cross section includes a bulge,
   wherein the second profile cross section includes an indentation, and
   wherein the first profile cross section and the second profile cross section are configured so that the bulge snaps into the indentation upon application of pressure.

6. The floor system according to claim 5, wherein the bulge is based on an arcuate form or a drop shape.

7. The floor system according to claim 1, wherein the second connection element is adhered to an underside of the floor panel.

8. The floor system according to claim 1, wherein at least one of the first connection members and second connection members is made of a metallic material.

9. The floor system according to claim 1, wherein the base part is made of a fibre-reinforced plastic material.

10. The floor system according to claim 1, wherein the floor panel is made of a fibre-reinforced plastic material.

11. The floor system according to claim 1, wherein the second connection element is integrated in a top layer of the floor panel.

12. The floor system according to claim 1, wherein multiple stiffening members are uniformly distributed in the depression.

13. An aircraft comprising an interior with a floor support structure and a floor arranged thereupon, wherein the floor is produced using a floor system according to claim 1.

14. The aircraft according to claim 13, wherein the interior is a cabin or a cargo hold.

15. The floor system according to claim 1, wherein the base part comprises at least one first hole in at least one of the peripheral surfaces,
   wherein the floor panel comprises at least one second hole aligned with the at least one first hole to receive a fastener.

* * * * *